United States Patent [19]

Nagashima

[11] Patent Number: 4,901,760
[45] Date of Patent: Feb. 20, 1990

[54] REED VALVE MEANS

[75] Inventor: Akira Nagashima, Kawasaki, Japan

[73] Assignee: Kioritz Corporation, Mitaka, Japan

[21] Appl. No.: 166,536

[22] Filed: Mar. 10, 1988

[30] Foreign Application Priority Data

Mar. 18, 1987 [JP] Japan ............................ 62-39703[U]

[51] Int. Cl.⁴ .............................................. F16K 15/14
[52] U.S. Cl. .................................... 137/514; 137/856; 137/904
[58] Field of Search ................ 137/855, 856, 514, 904

[56] References Cited

U.S. PATENT DOCUMENTS

| | | | |
|---|---|---|---|
| 3,939,867 | 2/1976 | Lundvik et al. | 137/856 X |
| 4,076,047 | 2/1978 | Akahori | 137/856 |
| 4,179,883 | 12/1979 | Nishiyama | 137/856 X |
| 4,599,978 | 7/1986 | Kamata et al. | 137/856 X |
| 4,664,154 | 5/1987 | Kamata et al. | 137/857 |
| 4,696,263 | 9/1987 | Boyesen | 137/855 X |

FOREIGN PATENT DOCUMENTS

| | | |
|---|---|---|
| 1024763 | 2/1958 | Fed. Rep. of Germany . |
| 2122656 | 9/1972 | France . |
| 163375 | 12/1980 | Japan .................................. 137/856 |
| 156566 | 12/1981 | Japan .................................. 137/856 |

Primary Examiner—Robert G. Nilson
Attorney, Agent, or Firm—Browdy and Neimark

[57] ABSTRACT

Reed valve means in which a valve plate is held at one end by a valve seat member of a resilient material and an open-position regulating member of a resilient material, and the interior of a fluid flow port is formed in complementary to the configuration of said reed valve means so that the reed valve means are held press-fitted against the interior of said fluid flow passage.

2 Claims, 1 Drawing Sheet

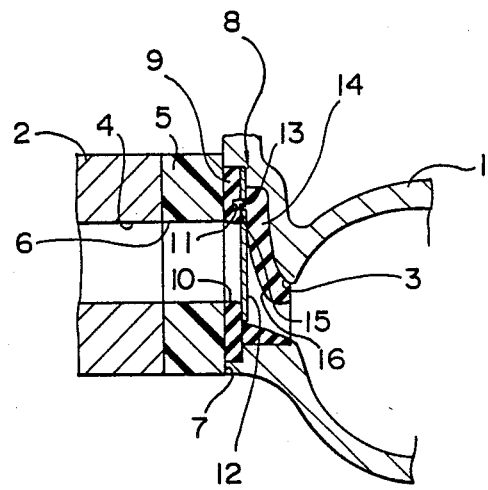

REED VALVE MEANS

BACKGROUND OF THE INVENTION

1. Field of the Invention

This invention relates to reed valve means for opening and closing a fluid flow port.

2. The Prior Art

Conventionally, for example, in an internal combustion engine having a reed valve as the check valve at the intake port of the cylinder to be supplied with the mixture from the carburetor, such a reed valve comprises a valve seat member made of a steel plate etc., disposed on a surface at the cylinder side of an insulation plate which is interposed between the carburetor and the cylinder, a flexible valve plate provided on a surface of the valve seat member, and open-position regulating member made of a steel plate extending over the outer surface of the valve plate to control the opened position of the valve plate, these parts being arranged so as to be fixed together with screw fasteners at one end of them.

According to such a conventional valve, there remain a number of problems such as, the complication in the assembling or fastening operation of the reed valve, a possible danger of the valve falling out because of looseness of the screw fasteners when in use, and some difficulties in obtaining a sealing tightness between the valve seat member and the valve plate because the valve seat member is manufactured from a steel plate. In addition to the above, the valve plate may be readily broken due to repeated bumping of the valve plate against the hard valve seat member. It is further necessary to prepare certain dead spaces for receiving the open-position regulating member of the reed valve and the heads of the screw fasteners protruding at the side of the cylinder or the other components. However those spaces result in the accumulation of fuel or the like causing the valve operations to become unstable.

SUMMARY OF THE INVENTION

Accordingly, one object of the present invention is to solve the problems inherent in conventional reed valves, and to provide a novel reed valve means having a structure so simple as to be readily manufactured and assembled.

That is, the reed valve means for opening and closing a fluid flow port, according to the present invention, is characterized in that a valve plate is held at one end thereof by a valve seat member of a resilient material and an open-position regulating member of a resilient material, and that the interior of said fluid flow port is formed complementary to the configuration of said reed valve means so that the reed valve means are held, press-fitted against the interior of said fluid flowing port.

In such an arrangement, according to the present invention, the respective parts of the reed valve means are securely held without a number of peculiar fastening pieces such as screws, and the valve seat member and the open-position regulating member serve as shock absorbers during opening and closing operations for the valve plate. Thus, according to the present invention, the number of components may be minimized so as to be manufactured at low cost, the possibility of the screw fasteners falling out of the valve body is eliminated; there is no longer dead spaces in which fuel or the like may be trapped, whereby the valve means is improved in stability; because the valve seat member and open-position regulating member are manufactured from resilient material, these members serve as shock absorbers to prevent the valve plate from damage, thereby conspicuously increasing the durability of the valve.

BRIEF DESCRIPTION OF THE DRAWING

The figure is a cross-sectional view showing a main part of an internal combustion engine incorporating reed valve means in accordance with one embodiment of the present invention.

DESCRIPTION OF THE PREFERRED EMBODIMENT

The present invention will be fully described hereinafter with reference to the drawing showing one preferred embodiment.

An illustrated embodiment shows one example of reed valve means according to the present invention, which is mounted on a 2-cycle internal combustion engine. The internal combustion engine includes a cylinder 1 and a carburetor 2 supplying air-fuel mixture as fluid into the cylinder 1. The cylinder 1 is provided at one side with an intake port 3 through which the fluid passes, whereas an discharge port 4 for discharging the mixture is disposed adjacent to the intake port 3 of the cylinder 1. There is provided an insulation block 5 of suitable synthetic resin interposed between the cylinder 1 and the carburetor 2, the discharge port 4 of the carburetor 2 is communicated to the intake port 3 of the cylinder 1 through a through hole 6 formed extending through the insulation block 5.

A reed valve means 8 according to the present invention is mounted on one side surface 7 of the insulation block 5 opposite to the side of the cylinder 1. This reed valve means 8 includes a plate-like valve seat member 9 which is located on the one side surface 7 of the insulation block 5 and is of a resilient material such as rubber; the valve seat member 9 is formed with a valve aperture 10 corresponding to the through hole 6 of the insulation block 5, and the valve seat member 9 is provided with a recess 11 at one end thereof. A valve plate 12 made of such a flexible material as a thin stain-less steel plate is attached on one side surface of the valve seat member 9 opposite to the one side of the cylinder 1. The valve plate 12 includes at one end thereof a perforation 13 in register with the recess 11 of the valve seat member 9. The valve plate 12 extends across the surface of the valve seat member 9 at the side of the cylinder 1. The valve plate 12 closes the valve aperture 10 of the valve seat member 9 when it is in the closed position illustrated. An open-position regulating member 14 for controlling the open-position of the valve plate 12 is provided at the other side of the valve plate opposite to the valve seat member 9. The open-position regulating member 14 is also made from a resilient material such as rubber, corresponding to the valve seat member 9, at one end of which a projection 15 is formed to be fitted into the perforation 13 of the valve plate 12 and the recess 11 of the valve seat member 9. Further, the open-position regulating member 14 forms a curvature 16 extending from one side to the other side thereof in a direction apart from the valve seat member 9, or toward the interior of the intake port 3 of the cylinder 1. When the valve plate 12 moves to the open-position along the curvature 16, the valve aperture 10 of the valve seat member 9 is communicated to the intake port 3 of the cylinder 1. Furthermore, the valve seat member 9 made from the resilient material serves as a shock absorber when the valve plate 12 abuts against the valve seat member 9 at the closed position, while the open-position regulating member 14 also functions as a shock absorber for the valve plate 12 at the opened position, thereby effectively protecting the valve plate 12 from damage.

The intake port 3 of the cylinder 1 is formed with a stepped surface having an inner contour complementary to the outer shapes of the valve seat member 9 and the open-position regulating member 14 for the reed valve means 8. When the cylinder 1 and the insulation block 5 are press-fitted with each other, the reed valve means 8 can be tightly fitted against the stepped surface of the intake port 3 of the cylinder 1 so as to be held non-detachably while the projection 15 of the open-position regulating member 14 is protruded into the perforation 13 of the valve plate 12 and the recess 11 of the valve seat member 9.

What is claimed is:

1. Reed valve means arranged between an upstream member and a downstream member for opening and closing a fluid flow port comprising a valve plate held at one end thereof by a valve seat member of a resilient material and an open position regulating member of a resilient material, an inner contour of said fluid flow port is formed so as to be complementary to the outer shapes of said reed valve means so that the reed valve means is held press-fitted against the interior of said fluid flow port by said upstream and downstream members.

2. Reed valve means according to claim 1 wherein said valve plate is provided with a perforation, said valve seat member is formed with a recess, as well as a projection to be inserted into said perforation and said recess is formed on said open-position regulating member.

* * * * *